JAMES S. COMINS
PAUL J. GALLAGHER
INVENTORS

BY Ralph E. Bitner
ATTORNEY

United States Patent Office 2,801,383
Patented July 30, 1957

2,801,383
VOLTAGE REGULATOR

James S. Comins, Stamford, Conn., and Paul J. Gallagher, Mamaroneck, N. Y., assignors to Sorensen & Company, Incorporated, a corporation of Connecticut Application September 24, 1956, Serial No. 611,638

9 Claims. (Cl. 323—66)

This invention relates to a voltage regulator with a sensing system which can be adjusted to approximate the root-mean-square, the peak, or the average voltage across a load circuit. It has particular reference to voltage regulators using components which do not include vacuum tubes, glass enclosed discharge devices, or any other type of equipment which is susceptible to mechanical shock.

Voltage regulators employing a filamentary diode as the sensing element transmit a value of voltage or current to a control circuit which is proportional to the root-mean-square of the voltage across a load circuit. When the load voltage is not a pure sine wave the root-mean-square value is the only true index of transmitted energy and is therefore the best means of producing a regulated voltage for highly accurate regulators. The filamentary diode, however, has several disadvantages. It has a glass envelope, a highly evacuated space, and a heated filament which is subject to breakage and even with the best of care will burn out eventually. Many other forms of sensing circuits have been devised and used but they all produce results which are proportional to the average value of the voltage or current instead of the root-mean-square value and therefore do not provide accurate regulation when the wave form is distorted.

The present invention includes a voltage regulator having a sensing circuit employing semi-conductor diode elements in a manner which approximates the root-mean-square value of a load voltage, the degree of approximation being highly accurate.

One of the objects of this invention is to provide an improved voltage regulator which avoids one or more of the disadvantages and limitations of prior art arrangements.

Another object of the invention is to provide a voltage regulator which will regulate the voltage across a load in response to its root-mean-square value.

Another object of the invention is to provide a voltage regulator which will withstand mechanical shock and excessive vibration without changing its operating characteristics.

Another object of the invention is to provide a voltage regulator which is reduced in size and capable of compact mechanical design.

The invention comprises an alternating current voltage regulator having a saturable reactor coupled between a source of alternating current power and a load. The sensing device across the load circuit includes a plurality of crystal diodes connected to a rectifier circuit. The crystal diodes are given various biasing potentials so that the output from the combined diode circuits closely approximates a current-voltage relationship having a squared characteristic. The sensing circuit is connected to the input of a transistor amplifier, the output of which is connected to a control winding on the saturable reactor. For a better understanding of the present invention, together with other and further objects thereof, reference is made to the following description taken in connection with the accompanying drawings.

Figure 1:
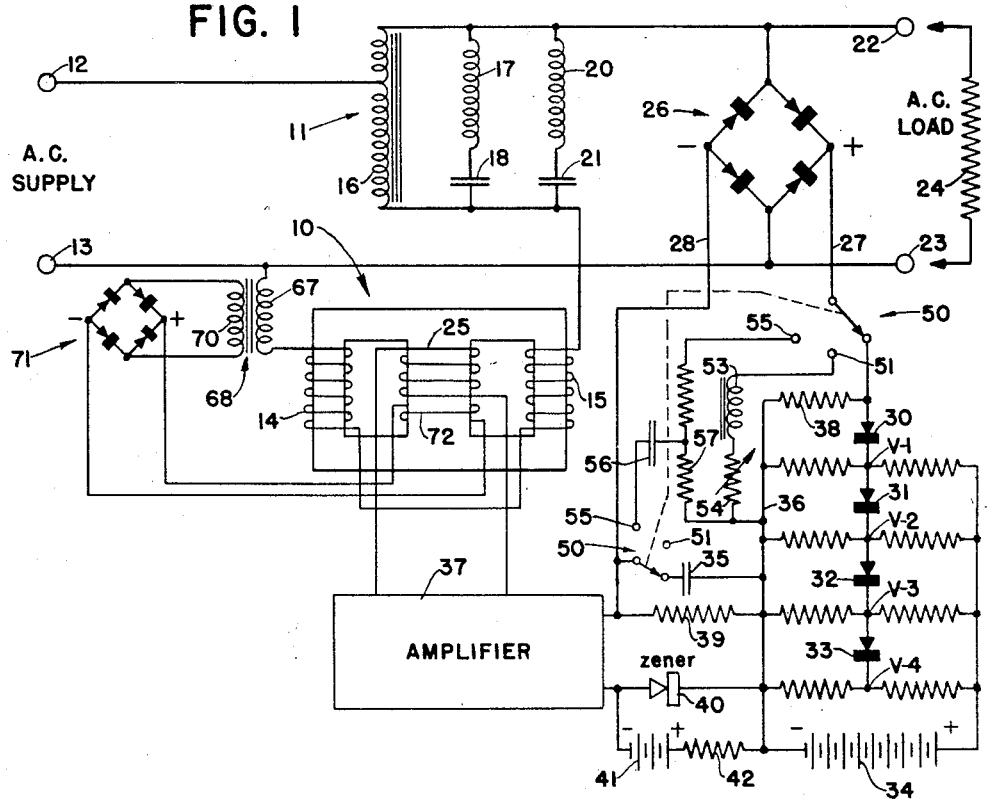
Fig. 1 is a schematic diagram of connections of the voltage regulator.

Referring now to the drawings, Fig. 1 shows the usual arrangement of a saturable reactor 10 in combination with an autotransformer 11. Alternating current power is applied at terminals 12 and 13, the inductor windings 14 and 15 of the saturable reactor being connected in series with winding 16 of the autotransformer. Since the saturable reactor distorts the wave form somewhat, series resonant circuits usually are connected across winding 16 in order to absorb the higher harmonics generated. Inductor 17 and capacitor 18 are tuned to the third harmonic of the input frequency while inductor 20 and capacitor 21 are tuned to resonance for the fifth harmonic. Output terminals 22 and 23 are respectively connected to one side of the autotransformer 11 and one side of the saturable reactor 10. A load 24 is connected to terminals 22 and 23. The saturable reactor 10 may include the usual three-legged core having inductor windings 14 and 15 on the two outside legs with a direct current control winding 25 on the central leg.

In order to sense the voltage across load terminals 22, 23, a rectifier bridge 26 is employed having four crystal diodes, connected as the four arms thereof as shown. The direct current derived from this bridge is applied over conductors 27 and 28 to a plurality of crystal diodes 30, 31 32, and 33, connected in series with each other and each biased by a separate voltage divider. All the voltage dividers are connected in parallel with each other and receive electrical power from a source of potential 34. The voltage dividers are arranged so that each diode is supplied with a biasing voltage a few volts higher than its adjacent diode starting at the positive terminal. For example the junction point V–1 may be biased at five volts, V–2 at 10 volts, V–3 at fifteen volts and V–4 at twenty volts, this being a representative voltage allocation for a voltage regulator which would normally supply a load voltage of fifteen volts. The capacitor 35 is connected between the negative terminal of the bridge and conductor 36 of the sensing circuit to pass all of the alternating current components which may exist in this part of the circuit leaving substantially direct current in resistor 39. This circuit provides a pure direct current voltage for amplifier 37. A resistor 38 is connected between conductor 27 and conductor 36 and constitutes the only resistance element which carries current for voltages less than the voltage of junction point V–1.

The input circuit of amplifier 37 includes a crystal diode 40 which is connected in the circuit in the reverse of the usual mode. This diode is known as a "Zener" diode and transmits current only when the applied voltage is greater than the "Zener" voltage in the reverse direction. Diode 40 is biased by a source of potential 41 in series with a resistor 42. Amplifier 37 must be a direct current amplifier, its output being connected directly to the control winding 25 of the saturable reactor 10.

Figure 3:
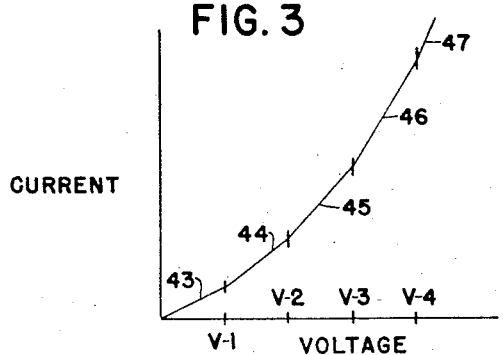
Fig. 3 is a graph illustrating how the combined characteristics of the crystal diodes produce a relationship which is proportional to the root-mean-square value of the voltage.

The operation of this circuit is as follows: When the circuit is stabilized and is supplying the correct voltage to load 24 the rectified current from bridge 26 is applied to the diode circuit and produces currents through about half the diodes. The voltage-current relationship is illustrated in Fig. 3 where the line 43 represents the current through resistor 38. A voltage in excess of V-1 sends current through diode 30 (and also resistor 38), the additional current being represented by line 44 in Fig. 3. Voltages in excess of V-2 send current through the previously mentioned components and diode 31, this current being represented by line 45 in Fig. 3. In a similar manner voltages in excess of V-3 produce a current-voltage characteristic as indicated by line 46 and if there is any voltage in excess of V-4 the result will be indicated by line 47.

The combination of lines 43 to 47 closely approximate a squared relationship between the current and voltage appearing between conductors 27 and 36. It should be noted that the voltage applied to these two conductors is a series of unidirectional pulses, the pulses having all the harmonics and wave form distortion of the voltage applied to load 24 since there is no filtering means in this part of the circuit and capacitor 35 is large enough to transmit these pulses without changing their wave shape.

The current from the network of diodes is then passed through resistor 39 to develop a direct current voltage. The voltage across resistor 39 is in series with the voltage applied across the "Zener" diode 40 and bucks it so that the difference betweene these two voltages is applied to the amplifier 37. This difference (or error) voltage is amplified and applied to control winding 25 to maintain the root-mean-square output voltage constant.

The above described circuit is for maintaining a constant root-mean-square voltage value at the output terminals. If it is desired to change the circuit to present a constant average voltage at the output terminals, switch 50 is moved so that its contact arms rest on the second contacts 51, and the rectified current from bridge 26 is filtered through choke 53 and resistor 54 without the by-pass action of capacitor 35 nor the effects of the diode circuit. The operation of this circuit is substantially the same as that described above except that the average voltage is sensed and the regulator operates to maintain this average voltage constant.

If it is desired to maintain a constant peak voltage at the output terminals, switch 50 is moved until its two arms are on the third contacts 55. This presents a chargeable capacitor 56 to the bridge rectifier 26, the charge leaking off slowly through high resistor 57. The result is a direct current voltage across resistor 39 which is proportional to the average voltage peak of both halves of the output wave. It has been found that an RC time constant of 250 milliseconds for components 56, 57, is a good practical value for a 60 cycle supply.

The circuit shown gives an average of both halves of the alternating current wave since the bridge 26 is a full wave rectifier. I will be obvious that voltage values of either half of the wave may be sensed by changing the bridge so that only half of the wave is rectified.

Figure 2:
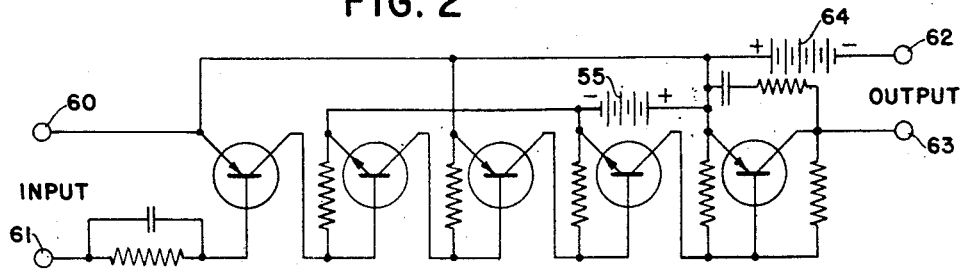
Fig. 2 is a schematic diagram of connections of a transistor amplifier which may be used between the sensing circuit and the saturable reactor.

The amplifier shown in Fig. 2 is a conventional five stage transistor amplifier having input terminals 60, 61, and output terminals 62, 63. A source of potential 64 is in series with output terminal 62 and supplies three of the emitters with positive potential. A second source of potential 55 supplies the emitters of the two NPN transistor stages with negative potential.

The battery 41 in series with resistor 42 biases the "Zener" diode 40 so that it operates on a steep part of its characteristic curve. Due to this condition, a change of current of plus or minus ten percent changes the voltage less than .1 percent, and hence operates as an efficient constant voltage circuit component. A constant voltage battery such as a standard cell or any other type of constant voltage component could be used instead of the "Zener" diode.

The circuit described above is capable of supplying a constant alternating current voltage at load terminals 22, 23, when both the load and the source of supply are varied. These variations may be quite large but it has been found that the range of such variations may be extended considerably by the inclusion of an additional compensating circuit which includes a primary winding 67 of a transformer 68 having a secondary winding 70. The primary winding 67 is connected in series with windings 14 and 15 on saturable reactor 10. The secondary winding 70 is connected to opposite junction points of a rectifier bridge 71, the other two junction points being connected to a second control winding 72 on the central leg of the saturable reactor 10 beside the first control winding 25.

The operation of the above circuit is as follows: When the load 24 is decreased in resistance causing an increase in the load current, the current through winding 67 increases and as a result, the direct current through winding 72 increases, thereby increasing the saturation of the core of saturable reactor 10 and lowering the inductance value of windings 14 and 15. This action increases the voltage across terminals 22, 23, and compensates for the additional current. Variations of the input voltage cause similar variations in the control windings 72 and 25 and compensate for changes in the output voltage.

The use of two sensing circuits not only widens the range of voltage compensation but also reduces the recovery time by a considerable amount. While the recovery time depends primarily upon the power used in windings 72 and 25, faster operation is obtained when both circuits are employed.

While there have been described and illustrated specific embodiments of the invention, it will be obvious that other types of amplifiers can be used instead of the one illustrated. Also, any type of voltage reference can be employed and the number of diodes in the sensing circuit may be reduced. The invention should be limited only by the scope of the appended claims.

We claim:

1. A voltage regulator for an alternating current supply system comprising, a coupling circuit which transfers alternating current power from a pair of input terminals to a pair of output terminals connected to a load, said coupling circuit including a variable impedance which may be controlled to vary the voltage at the output terminals, a voltage sensing circuit connected across the output terminals for determining the root-mean-square value of the output voltage, said sensing circuit including a plurality of diode rectifiers each connected to a voltage biasing circuit for the production of a non-linear current, and coupling means between the sensing circuit and a control means in said variable impedance which changes the impedance in response to variations in the value of the root-mean-square output voltage.

2. A voltage regulator for an alternating current supply system comprising, a coupling circuit which transfers alternating current power from a pair of input terminals to a pair of output terminals connected to a load, said coupling circuit including a saturable reactor having a pair of reactance windings and a control winding which is employed to vary the reactance of said reactance windings, a voltage sensing circuit connected across the output terminals for determining the root-mean-square value of the output voltage, said sensing circuit including a plurality of diode rectifiers each connected to a voltage biasing circuit for the production of a non-linear current, and coupling means between the sensing circuit and said control winding in the saturable reactor which changes the reactance in response to variations in the value of the root-mean-square output voltage.

3. A voltage regulator for an alternating current supply system comprising, a coupling circuit which transfers alternating current power from a pair of input terminals to a pair of output terminals connected to a load, said coupling circuit including a variable impedance which may be controlled to vary the voltage at the output terminals, a voltage sensing circuit connected across the output terminals for determining the root-mean-square value of the output voltage, said sensing circuit including a rectifying means which produces a series of unidirectional voltage pulses, and a plurality of diode rectifiers each connected to a voltage biasing circuit for the production of a non-linear current, and coupling means between the sensing circuit and a control means in said variable impedance which changes the impedance in response to variations in the value of the root-mean-square output voltage.

4. A voltage regulator for an alternating current supply system comprising, a coupling circuit which transfers alternating current power from a pair of input terminals to a pair of output terminals connected to a load, said coupling circuit including a variable impedance with control means which varies said impedance and the voltage across the output terminals, a voltage sensing circuit connected across the output terminals for determining the root-mean-square value of the output voltage, said sensing circuit including a plurality of diode rectifiers each connected to a voltage biasing circuit for the production of a non-linear current in a portion of said sensing circuit, and an amplifier coupled between said portion of the sensing circuit and said variable impedance control means for varying the impedance in response to variations in the value of the root-mean-square output voltage.

5. A voltage regulator for an alternating current supply system comprising; a coupling circuit which transfers alternating current power from a pair of input terminals to a pair of output terminals connected to a load; said coupling circuit including a variable impedance with control means which varies said impedance value and the voltage across the output terminals; a voltage sensing circuit connected across the output terminals for determining the root-mean-square value of the output voltage; said sensing circuit including a rectifying means which produces a series of unidirectional voltage pulses, a plurality of diode rectifiers each connected to a voltage biasing circuit for the production of a non-linear current in a portion of said sensing circuit, and an amplifier coupled to said portion of the sensing circuit; and coupling means between an output circuit of said amplifier and said variable impedance control means for varying the impedance in response to variations in the value of the root-mean-square output voltage.

6. A voltage regulator for an alternating current supply system comprising; a coupling circuit which transfers alternating power from a pair of input terminals to a pair of output terminals connected to a load; said coupling circuit including a saturable reactor having a pair of reactance windings and a control winding which is employed to vary the reactance of said reactance windings; a voltage sensing circuit connected across the output terminals for determining the root-mean-square value of the output voltage; said sensing circuit including a rectifying means which produces a series of unidirectional voltage pulses and a plurality of diode rectifiers each connected to a voltage biasing circuit for the production of a non-linear current in a portion of said sensing circuit; and an amplifier coupled between said portion of the sensing circuit and said control winding on the saturable reactor for varying the reactance in response to variations in the value of the root-mean-square output voltage.

7. A voltage regulator for an alternating current supply system comprising, a coupling circuit which transfers alternating current power from a pair of input terminals to a pair of output terminals connected to a load, said coupling circuit including a variable impedance which may be controlled to vary the voltage at the output terminals, a voltage sensing circuit connected across the output terminals for determining the root-mean-square value of the output voltage, said sensing circuit including a plurality of diode rectifiers each connected to a voltage biasing circuit for the production of a current having a non-linear relationship with the output voltage and a constant voltage reference circuit in series with a resistor carrying said non-linear current for the production of an error voltage which is the difference between the output voltage and a predetermined desired output voltage, and coupling means between the sensing circuit and a control means in said variable impedance which changes the impedance in response to said error voltage.

8. A voltage regulator for an alternating current supply system comprising, a coupling circuit which transfers alternating current power from a pair of input terminals to a pair of output terminals connected to a load, said coupling circuit including a saturable reactor having a pair of reactance windings and a first and second control winding which are employed to vary the reactance of said pair of windings, a voltage sensing circuit connected across the output terminals for determining the root-mean-square value of the output voltage, said sensing circuit including a plurality of diode rectifiers each connected to a voltage biasing circuit for the production of a non-linear current, coupling means between the sensing circuit and said first control winding in the saturable reactor which changes the reactance in response to variations in the value of the root-mean-spuare output voltage, and coupling means connected between the input terminals and said second control winding for changing the reactance in response to variations in the value of the input voltage.

9. A voltage regulator for an alternating current supply system comprising, a coupling circuit which transfers alternating current power from a pair of input terminals to a pair of output terminals connected to a load, said coupling circuit including a saturable reactor having a pair of reactance windings and a first and second control winding, a voltage sensing circuit connected across the output terminals for determining the root-mean-square value of the output voltage, said sensing including a rectifying means which produces a series of unidirectional voltage pulses and a plurality of diode rectifiers each connected to a voltage biasing circuit for the production of a non-linear current in a portion of said sensing circuit, an amplifier coupled between said portion of the sensing circuit and said first control winding in the saturable reactor which changes the reactance in response to variations in the value of the root-mean-square output voltage, and coupling means connected between the input terminals and said second control winding for changing the reactance in response to variations in the value of the input voltage.

References Cited in the file of this patent

UNITED STATES PATENTS

| 2,581,124 | Moe | Jan. 1, 1952 |
| 2,697,201 | Harder | Dec. 14, 1954 |